(12) United States Patent
Ikuta

(10) Patent No.: US 7,383,637 B2
(45) Date of Patent: Jun. 10, 2008

(54) INCLINATION SENSOR AND METHOD OF ATTACHING THE SAME

(75) Inventor: Kenji Ikuta, Tsurugashima (JP)

(73) Assignee: Toyo Denso Kabushiki Kaisha (JP)

( * ) Notice: Subject to any disclaimer, the term of this patent is extended or adjusted under 35 U.S.C. 154(b) by 34 days.

(21) Appl. No.: 11/297,065

(22) Filed: Dec. 7, 2005

(65) Prior Publication Data

US 2006/0137199 A1    Jun. 29, 2006

(30) Foreign Application Priority Data

Dec. 27, 2004    (JP)    ............... 2004-382906

(51) Int. Cl.
*G01C 9/12*    (2006.01)
(52) U.S. Cl. ..................... 33/391; 33/366.24
(58) Field of Classification Search ............... 33/365, 33/366.24, 375, 391–402
See application file for complete search history.

(56) References Cited

U.S. PATENT DOCUMENTS

| | | | | |
|---|---|---|---|---|
| 1,399,423 A | * | 12/1921 | Cunningham | ................ 33/396 |
| 2,527,982 A | * | 10/1950 | Brock | ......................... 33/391 |
| 2,834,117 A | * | 5/1958 | Kenyon | ....................... 33/402 |
| 4,614,041 A | * | 9/1986 | Darton et al. | ................ 33/396 |
| 4,843,725 A | * | 7/1989 | Harris | ......................... 33/391 |
| 5,574,442 A | * | 11/1996 | Kinoshita et al. | ............. 33/391 |
| 6,470,580 B1 | * | 10/2002 | Ushihara et al. | ......... 33/366.24 |

FOREIGN PATENT DOCUMENTS

JP    2001-256871    9/2001

* cited by examiner

*Primary Examiner*—G. Bradley Bennett
(74) *Attorney, Agent, or Firm*—Fulbright & Jaworski LLP

(57) ABSTRACT

Is disclosed an inclination sensor for detecting an inclination of a vehicle body in both lateral and longitudinal directions by a pendulum type movement rotatably supported on a rotation shaft mounted in the case, wherein the rotation shaft of the movement in the case is slanting to form a specified angle between a rotation plane of the movement and the case mounting plate surface attached to the vehicle body.

4 Claims, 6 Drawing Sheets

INCLINATION SENSOR AND METHOD OF ATTACHING THE SAME

BACKGROUND OF THE INVENTION

The present invention relates to an inclination sensor for sensing an inclination state of a running vehicle body and a method of attaching the inclination sensor to the vehicle body. In general, an inclination sensor is used for a safety system of a vehicle, which detects a turnover of the vehicle and, for example, cuts off the feeding of oil and/or switches off the ignition power supply system.

There has been developed an inclination sensor which comprises a case (housing) attached to a vehicle body, a pendulum type movement capable of freely rotating in the case in accordance with inclination of the vehicle body and a detector capable of electromagnetically sensing the magnetized part of the movement when a turnover of vehicle occurs (JP2001-256871).

The inclination sensor has been attached to the vehicle body in such a state that it can detect an inclination of the vehicle body in its lateral directions (sideways) by the pendulum movement set to swing in the same direction as the vehicle body laterally inclines.

The above-mentioned conventional inclination sensor still involves such a problem that its pendulum movement set to rotate in the lateral direction of the vehicle body cannot detect turn-over of the vehicle body in the longitudinal direction. To detect the turn-over of the vehicle in the longitudinal direction (backward or frontward), it is necessary to use an additional inclination sensor separately attached to the body so as to detect the turnover of the vehicle body in the longitudinal direction thereof.

SUMMARY OF THE INVENTION

It is therefore an object of the present invention to provide an inclination sensor for detecting an inclination state of a running vehicle body by sensing by a pendulum type movement which can freely rotate in a case attached to the vehicle body, wherein a rotation shaft of the pendulum type movement in the case is slanting to swing the pendulum in a plane forming a specified angle with a case mounting plate surface attached to the vehicle body.

Another object of the present invention is directed to a method of attaching to a vehicle body an inclination sensor having a pendulum type movement capable of freely rotating in a plane parallel to a case mounting plate surface, whereby the sensor case can be attached to the vehicle body so as to place the rotation shaft of the pendulum in a state tilted at a specified angle to the longitudinal (frontward and backward) direction of the vehicle body.

Inclinations of a running vehicle in both lateral and longitudinal directions of its body can be detected by only one inclination sensor constructed and attached thereto according to the present invention.

DETAILED DESCRIPTION OF THE PREFERRED EMBODIMENTS

Figure 1:
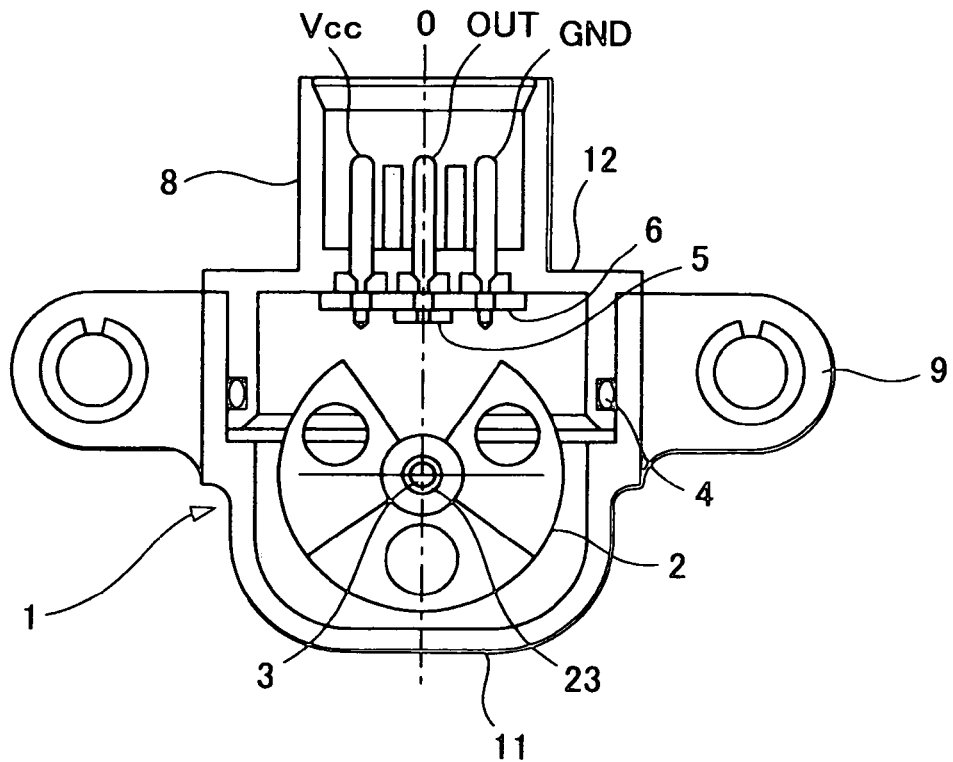
FIG. 1 shows a front basic construction view of an inclination sensor according to an embodiment of the present invention.
Figure 2:
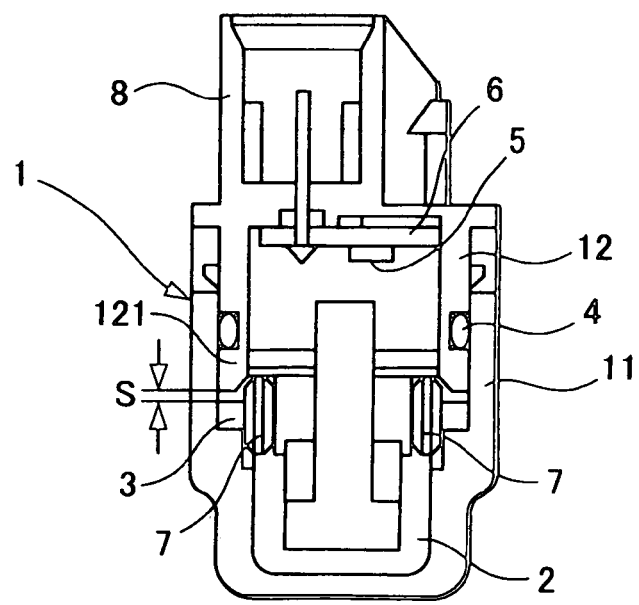
FIG. 2 is a side sectional view of the inclination sensor of FIG. 1.

FIGS. 1 and 2 are illustrative of a basic structure of an inclination sensor according to the present invention. In the inclination sensor, a magnetized pendulum type movement 2 is rotatably supported by a shaft 3 in a case 1. The case 1 comprises a lower case 11 and an upper case 12. The lower case 11 is fitted with a seal ring 4 onto the upper case 12 and hook-jointed with each other to form a waterproof structure of the case 1. The upper case 12 is provided with a mounting plate 9 for securing to the vehicle body.

In the upper case 12, there is mounted a circuit board 6 implemented with a sensing circuit which can output a signal when a Hall IC 5 detects an inclined state of the movement 2 over a predetermined rotation angle and makes itself turned ON. The upper case is provided with a receptacle portion 8 integrally formed therewith for connection of a terminal of a power supply source Vcc, a terminal of an earth GND and an output terminal OUT of the circuit board 6.

Figure 3:
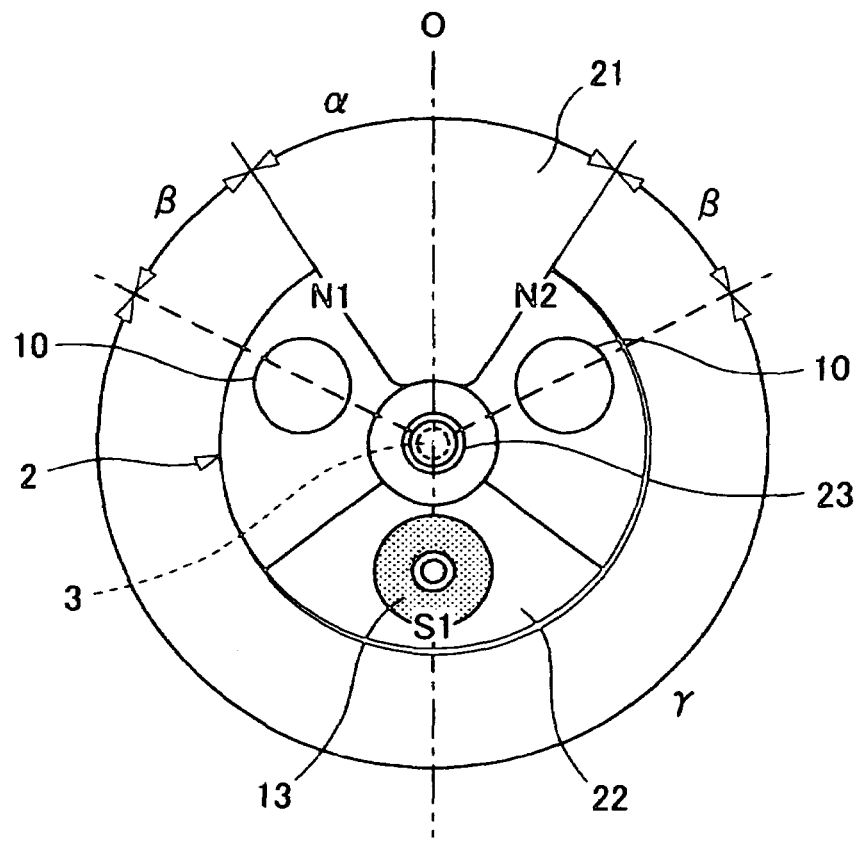
FIG. 3 is a front view showing a pendulum type movement of the inclination sensor of the embodiment of FIG. 1.
Figure 4:
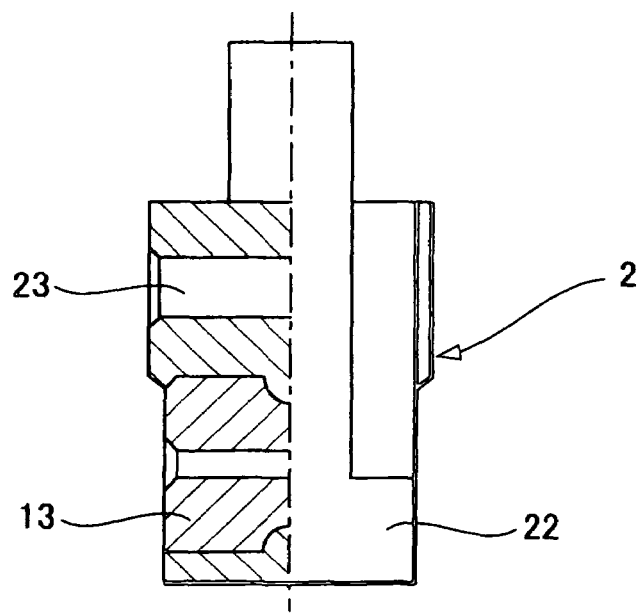
FIG. 4 is a side view of the movement of the inclination sensor shown in FIG. 3.

As shown in FIGS. 3 and 4, the movement 2 has a shaft hole 23 for inserting therein a shaft 3 with a clearance and it is provided with an upper notched portion 21 having an aperture angle α (for example of 62 degrees) on both sides from a reference point (rotational midpoint) O and a lower balancing portion 22 for positioning the reference point O in a vertical direction.

A Hall IC 5 attached to the circuit board 6 is of the unipolar sensitive type, which is disposed on the reference point (rotational midpoint) O of the movement 2. The Hall IC turns ON when it detected an S-polar part of the magnetized movement 2, which part was opposite thereto at that time.

In the thus constructed sensor according to the present invention, the shaft 3 inserted with a clearance in a shaft hole 23 of the movement 2 is provided with spacers 7 loosely fitted on both ends thereof and then mounted in the case 1, thereby the shaft 3 of the movement 2 has free ends with no restriction from the case 1. The spacers 7 can restrict the displacement of the movement 2 in the axial direction in the case 1.

Consequently, the rotation shaft 3 of the movement 2 has free ends with no restriction from the case 1 and does not directly transmit the oscillation of the running vehicle to the movement 2, thereby improving the rotational movement of the movement 2.

Figure 6:
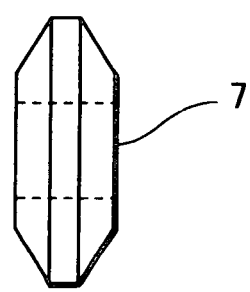
FIG. 6 is a side view of an exemplary spacer used in the inclination sensor according to the present invention.

As shown in FIG. 6, the spacer 7 has a "bead" shape so as to have a minimal surface for abutting on the movement 2 on the shaft. This can effectively prevent the occurrence of so-called "sticking" of the movement 2 to the spacer 7 even in the case the movement 2 was forced to the spacer when the case 1 was tilted in the direction reverse to that of rotation of the movement 2 at that time.

Figure 7:
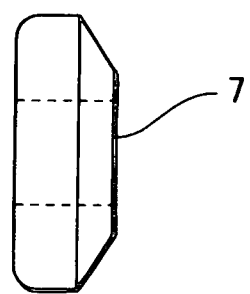
FIG. 7 is a side view of another exemplary spacer used in the inclination sensor according to the present invention.

It is of course possible to use a spacer 7 having a truncated cone shape (as shown in FIG. 7) or any other suitable shape having a reduced surface abutting on the movement 2.

The upper case 12 has a cap part 121 formed at its lower edge to enclose the upper half of both ends of the shaft body 3 with a gap S to prevent the movement 2 from falling off the given position in the lower case 11.

According to the present invention, the weight ratio of the upper portion to the lower portion of the movement 2 relative to its shaft hole 23 is preset to a suitable value in a range of 1:9 to 3:7 so as to prevent the movement 2 from unstably swinging with oscillation of the running vehicle. The results of experiments made with a number of samples (movements 2) having different weight ratios of their upper portion to lower portion by applying a certain oscillation to them indicate that the samples having weight ratios of their upper portion to lower portion in a range of 1:9 to 3:7 could be sufficiently stable against the oscillation. The sample having the weight ratio of 2:8 achieved the best oscillation frequency characteristic. Namely, when the weight of the upper portion relative to the lower portion of the movement 2 exceeds the above ratio, swinging motion of the movement 2 becomes unstable with oscillation because the center of gravity of the movement 2 is displaced upward.

The weight ratio of the upper portion to the lower portion of the movement 2 may be adjusted by making holes 10 in the upper portion and/or embedding a weight 13 in the lower portion.

According to the present invention, since the movement 2 has the best suited weight ratio of its upper portion to lower portion about the rotation shaft 3, it can rotate with a proper moment in accordance with the inclination of the case 1 attached to the running vehicle without being affected by oscillation of the vehicle body.

The movement 2 has an upper notched part 21 made at a relatively large aperture angle α so as to bring its rotational reference point 0 to a midpoint of the notched portion aperture. Therefore, the Hall IC does not respond to oscillation of the movement 2 within the aperture angle α. Consequently, the sensor according to the present invention can work normally without erroneous actuation from the oscillation of the running vehicle and can turn on its Hall IC only when the vehicle tilted at an angle exceeding a specified value.

Figure 5:
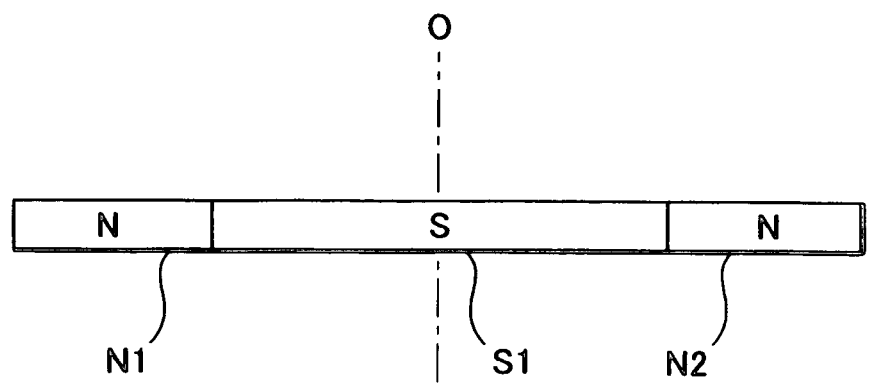
FIG. 5 is a development view showing a magnetized pattern of the movement.

The movement 2 has a plurality of magnetized (polarized) parts disposed symmetrically on both sides from the reference rotational midpoint as shown in FIGS. 3 and 5. Namely, the movement 2 has minute N-pole parts N1 and N2 (with an aperture angle β of, e.g. 27 degrees) disposed respectively on both sides of the notched portion 21 and a S-pole part Si (with a specified aperture angle γ of, e.g. 244 degrees) disposed between the two N-pole parts.

The movement having the multiple polarized parts can provide a sharp change in magnetic flux density at the boundary between an N-pole part and an S-pole part. This enables the sensor to accurately preset a position of the movement when the movement 2 rotates by an angle exceeding the specified angle opposing the S-pole part to the Hall IC 5 which turns ON at that time.

Figure 8:
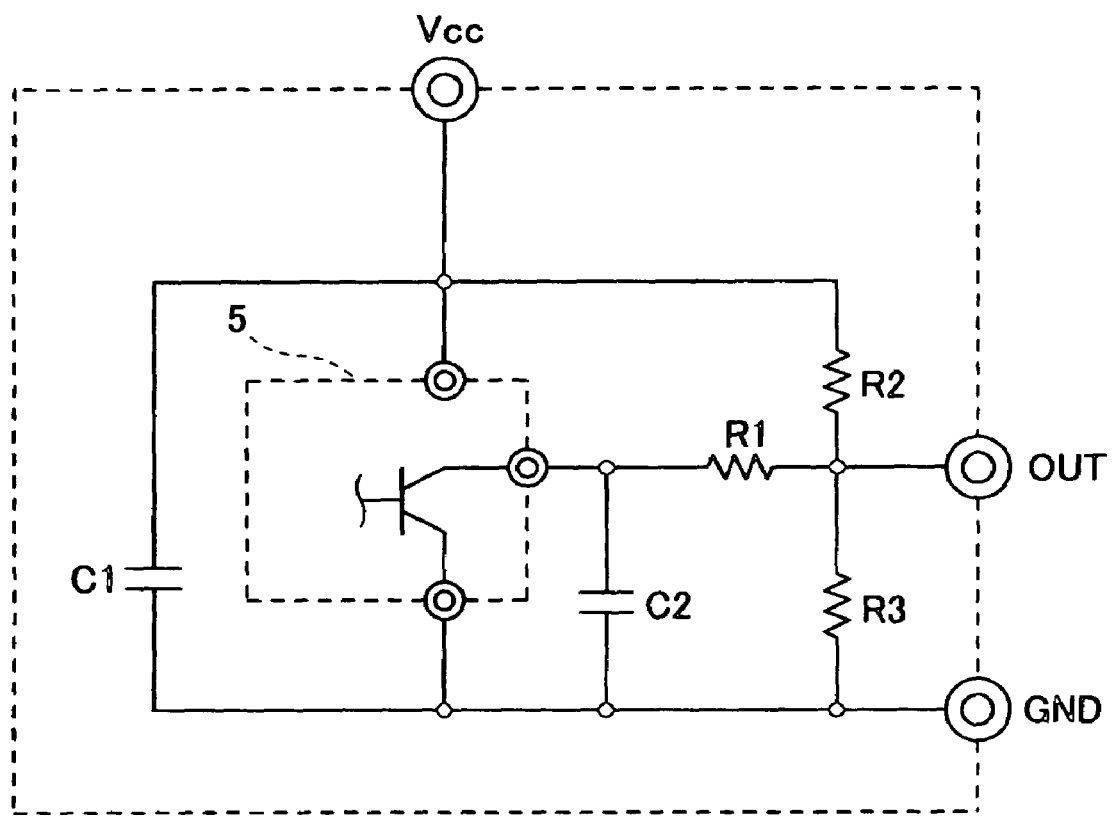
FIG. 8 is an electric circuit diagram of a sensor circuit of an inclination sensor used for detecting an inclination state of a vehicle according to the present invention.

FIG. 8 shows an exemplary sensor circuit for detecting an inclination (turnover) state of a running vehicle by turning on a Hall IC 5. The sensor circuit detects a rotation of the movement 2 exceeding a specified angle by turning on the Hall IC to output a high level detection signal. In the circuit diagram, a resistance R1 and a capacitor C2 forms a low pass filter for protecting the Hall IC 5. A capacitor C1 is provided for preventing the occurrence of noise and oscillation.

According to the present invention, the movement 2 is magnetized in the pattern as shown in FIGS. 3 and 5 so as to detect by the Hall IC the turnover state or stand-on-end (or stand-on-side) state of the vehicle body on a slope having a specified inclination angle.

Figure 9:
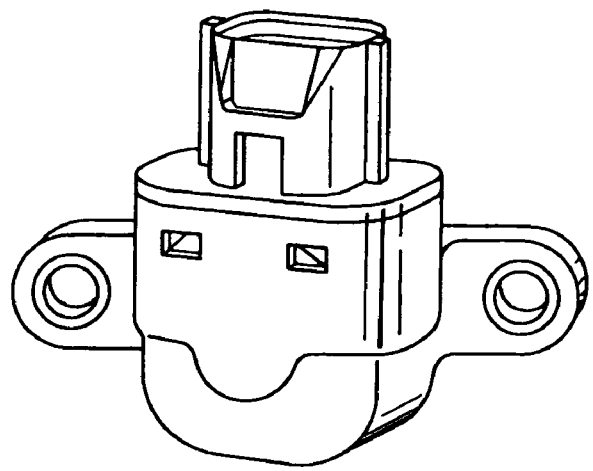
FIG. 9 is a perspective external view of an inclination sensor according to the present invention.

According to the present invention, the case 1 of the inclination sensor thus constructed is provided with a mounting plate to be attached with its surface A to a vehicle body. In this instance, the shaft 3 of the movement 2 in the case is slanting so as to form a specified angle θ (in a range of 10 to 45 degrees) between a rotation plane B of the movement 2 and the mount plate surface A of the case as shown in FIGS. 9 and 10.

The case 1 of the inclination sensor, in which the rotation shaft 3 of the movement 2 mounted slantways as described above, is then attached to the vehicle body in such a manner that the mounting plate surface A of the case 1 is aligned with the lateral direction X of the vehicle body. The inclination sensor thus attached to the vehicle body can detect inclinations of the running vehicle not only in the lateral direction X and also in the longitudinal direction Y by the movement 2 rotating in accordance with inclination of the running vehicle.

When the vehicle body tilted in a direction different from the direction of rotation plane B of the movement 2, the later is in this instance pushed to the spacer 7 but the shaft 3 can freely rotate in the spacer 7 without being stuck to the case 1, achieving smooth swinging of the pendulum in response to inclination of the running vehicle.

Figure 10:
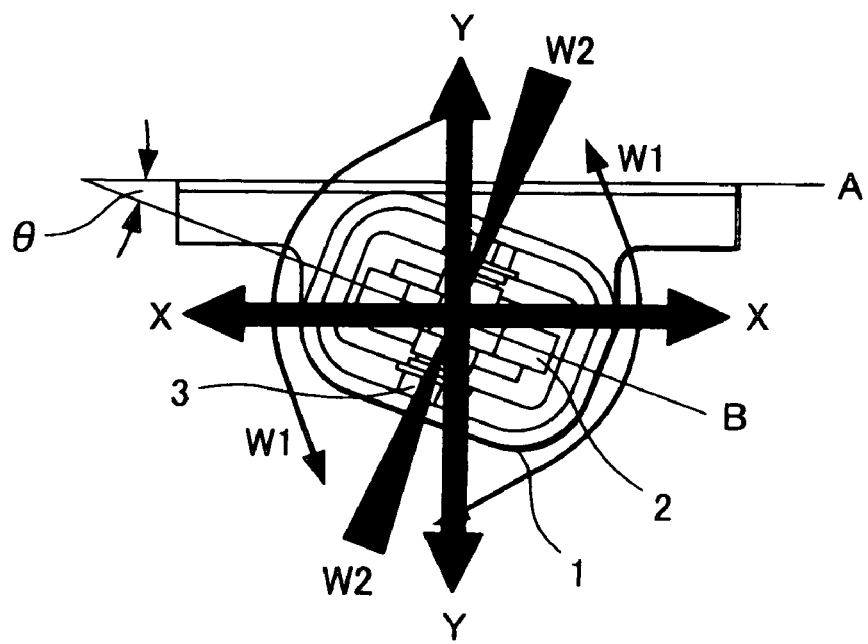
FIG. 10 is a sectional plan view of an inclination sensor according to the present invention.

FIG. 10 shows a sensitive area W1 and non-sensitive area W2 of the inclination sensor according to the present invention.

Figure 11:
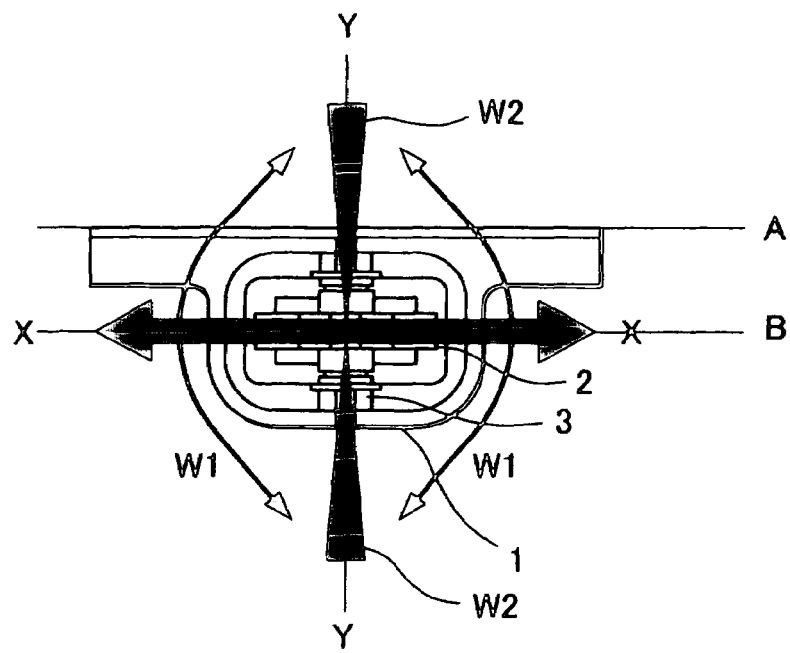
FIG. 11 is a sectional plan view of an inclination sensor to show inclination sensitive and not sensitive regions of the inclination sensor having a pendulum movement capable of rotating in a plane parallel to the sensor case mounting plate surface attached to a vehicle body.

FIG. 11 shows a sensitive area W1 and non-sensitive area W2 of an inclination sensor attached to a vehicle body, wherein a rotation shaft 3 of a movement 2 is not-slanting in a case 1 to freely rotate the movement in a rotation plane B being parallel to the mounting plate surface A of the case 1.

The experiments were made with the inclination sensor which is attached to the vehicle body at an angle φ preset in a range of 10 to 45 degrees between the mounting plate surface A of the case 1 and the rotation plane B of the movement 2. The experiment results indicate that the sensor is capable of reliably detecting inclinations of the running vehicle body in both lateral direction X and longitudinal direction Y thereof.

Figure 12:
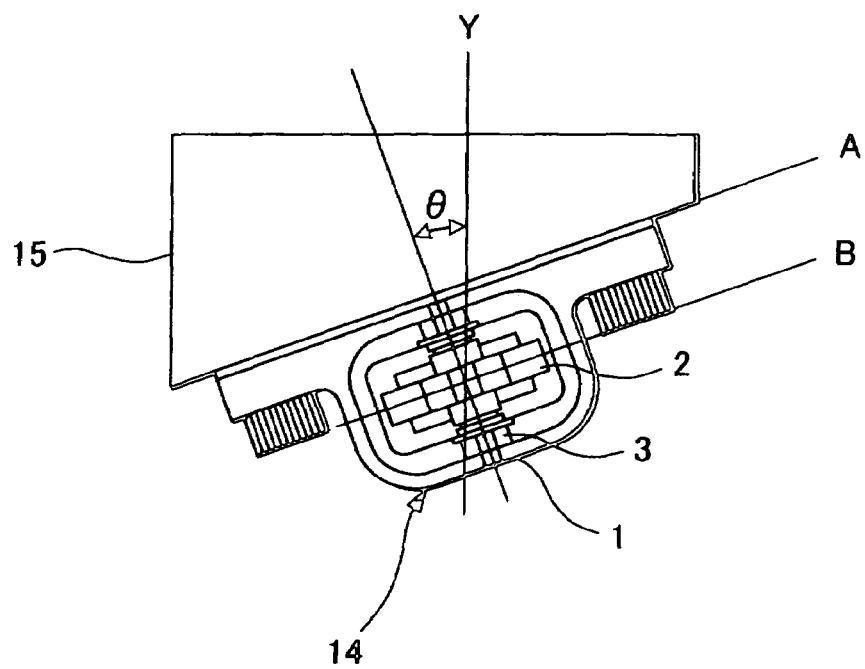
FIG. 12 is a sectional plan view of an inclination sensor which has a pendulum movement capable of rotating in a plane parallel to a case mounting plate surface attached to a vehicle body, showing a rotation shaft of the pendulum movement is tilted at a specified angle to an longitudinal (the front-to-rear) direction of the vehicle body.

According to the present invention, the inclination sensor 14 having a movement 2 capable of freely rotating in a plane parallel to a mount plate surface A of the sensor case is attached to a vehicle body 15 in such a manner that a shaft 3 of the movement 2 is slanting at a specified angle φ (within a range of 10 to 45 degrees) to the longitudinal direction Y of the vehicle body as shown in FIG. 12. In this instance, the inclination sensor having the same sensitive area WI as shown in FIG. 10 can detect by rotating its movement 2 in accordance with inclinations of the vehicle body in both lateral and longitudinal directions X and Y respectively.

INDUSTRIAL APPLICABILITY

According to the present invention, it is possible to provide an inclination sensor for detecting an inclination state of a running vehicle body by a pendulum type movement which can freely rotate in a case attached to the vehicle body, wherein a shaft of the pendulum in the case is placed in a tilted state so as to swing the pendulum in a rotation plane forming a specified angle with the case mounting plate surface attached to the vehicle body. Owing to the above construction, the inclination sensor can reliably detect inclinations of the running vehicle body in both lateral and longitudinal directions.

According to the method of attaching to a vehicle body an inclination sensor having a pendulum type movement capable of freely rotating in a rotation plane parallel to a case mounting plate surface attached to the vehicle body, whereby the sensor case can be attached to the vehicle body so as to place the rotation shaft of the pendulum in a state tilted at a specified angle to the longitudinal direction (frontward and backward) of the vehicle body. The inclination sensor thus attached to the vehicle body can reliably detect inclinations of the running vehicle body in both lateral and longitudinal directions of the vehicle body.

Inclinations of a running vehicle in both lateral and longitudinal directions of its body can be detected by only one inclination sensor constructed and attached thereto according to the present invention.

What is claimed is:

1. An inclination sensor for detecting an inclination state of a vehicle body, comprising a case incorporating a pendulum type movement rotatably supported on a rotation shaft disposed therein, wherein the rotation shaft of the movement is provided with a spacer loosely fitted on each side of the movement, the shaft being placed in the case in a slanting state to form a specified angle between a case mounting plate surface attached to the vehicle body and a rotation plane of the movement.

2. An inclination sensor as defined in claim 1, wherein the angle formed between the case mounting plate surface attached to the vehicle body and the rotation plane of the pendulum type movement is preset to a specified value in a range of from 10 to 45 degrees.

3. A method of attaching an inclination sensor having a pendulum type movement capable of freely rotating in a case in a rotation plane parallel to a case mounting plate surface attached to a vehicle body, whereby a rotation shaft of the movement is tilted at a specified angle to a longitudinal direction of the vehicle body and is provided with a spacer loosely fitted on each side of the movement.

4. A method of attaching an inclination sensor as defined in claim 3, whereby the rotation shaft of the movement forms a specified angle in a range of from 10 to 45 degrees to the longitudinal direction of the vehicle body.

* * * * *